(12) United States Patent
Labonté

(10) Patent No.: US 7,451,991 B2
(45) Date of Patent: Nov. 18, 2008

(54) ICE SKATE BOOT

(75) Inventor: Ivan Labonté, Montreal (CA)

(73) Assignee: Nike Bauer Hockey U.S.A., Inc., Greenland, NH (US)

( * ) Notice: Subject to any disclaimer, the term of this patent is extended or adjusted under 35 U.S.C. 154(b) by 685 days.

(21) Appl. No.: 11/057,767

(22) Filed: Feb. 15, 2005

(65) Prior Publication Data

US 2006/0179687 A1 Aug. 17, 2006

(51) Int. Cl.
*A63C 1/40* (2006.01)
(52) U.S. Cl. .................... 280/11.12; 280/841
(58) Field of Classification Search .............. 280/11.12, 280/11.19, 11.201–11.204, 11.221, 11.224, 280/11.225, 811, 841, 843; 36/87, 114, 115, 36/116
See application file for complete search history.

(56) References Cited

U.S. PATENT DOCUMENTS

| | | | | |
|---|---|---|---|---|
| 3,866,927 A * | 2/1975 | Tvengsberg | .............. | 280/11.12 |
| 4,088,335 A * | 5/1978 | Norton et al. | ............ | 280/11.18 |
| 4,384,413 A * | 5/1983 | Bourque | ..................... | 36/115 |
| 4,869,001 A * | 9/1989 | Brown | ......................... | 36/115 |
| 5,380,020 A * | 1/1995 | Arney et al. | ........... | 280/11.231 |
| 5,570,522 A * | 11/1996 | Olson et al. | ................... | 36/50.5 |
| 5,778,566 A * | 7/1998 | Edauw et al. | .............. | 36/117.1 |
| 5,836,592 A * | 11/1998 | Chang | ..................... | 280/11.26 |
| 5,924,706 A * | 7/1999 | Seltzer et al. | ............ | 280/11.31 |
| 5,997,014 A * | 12/1999 | Ellis et al. | .............. | 280/11.214 |
| 6,223,457 B1 * | 5/2001 | Graf | ............................ | 36/115 |
| 6,421,934 B2 * | 7/2002 | Graf | ............................ | 36/115 |
| 6,481,724 B1 * | 11/2002 | Whipp | ...................... | 280/7.13 |
| 6,663,116 B2 * | 12/2003 | Evans | .................... | 280/11.225 |
| 6,769,203 B1 | 8/2004 | Wright et al. | | |
| 6,871,424 B2 * | 3/2005 | Labonte et al. | ................ | 36/115 |
| 2002/0190487 A1 * | 12/2002 | Blankenburg et al. | .... | 280/11.12 |
| 2004/0217562 A1 * | 11/2004 | Haugen et al. | ......... | 280/11.221 |
| 2005/0067800 A1 * | 3/2005 | Alglave | ................. | 280/11.221 |

* cited by examiner

*Primary Examiner*—Christopher P Ellis
*Assistant Examiner*—Vaughn T Coolman

(57) ABSTRACT

An ice skate boot comprising an outer shell made of thermoformable material. The outer shell is thermoformed such that it comprises a heel portion for receiving the heel of a foot, an ankle portion for receiving the ankle, medial and lateral side portions for facing the medial and lateral sides of the foot, and medial and lateral toe portions for covering the toes of the foot. The medial and lateral side and toe portions are thermoformed such that they define medial and lateral skirt portions extending downwardly therefrom and forming together a bottom portion for receiving an ice skate blade.

34 Claims, 13 Drawing Sheets

US 7,451,991 B2

ICE SKATE BOOT

FIELD OF THE INVENTION

The present invention relates to an ice skate boot comprising an outer shell made of thermoformable material.

BACKGROUND OF THE INVENTION

The construction of ice skates has become quite complex over recent years. Existing skates often include multiple different components and multiple different materials in order to provide the performance and aesthetic needs of the players. As such, over recent years different manufacturing processes have been developed and new materials have been used.

The most recent trend in skate construction is to manufacture skates using lightweight components, and where possible to reduce the number of components. Accordingly, there is a need in the industry for a skate that is lighter and/or has less components than existing skates.

SUMMARY OF THE INVENTION

As embodied and broadly described herein, the invention provides an ice skate boot for enclosing a human foot, the foot having a heel, an ankle with a medial malleolus and a lateral malleolus, a plantar surface, medial and lateral sides and toes. The ice skate boot comprises an outer shell made of thermoformable material and thermoformed such that said outer shell comprises: (a) a heel portion for receiving the heel of the foot; (b) an ankle portion for receiving the ankle; (c) medial and lateral side portions for facing the medial and lateral sides of the foot respectively; (d) medial and lateral toe portions for covering the toes of the foot; and (e) a medial skirt portion extending downwardly from the medial side and toe portions and a lateral skirt portion extending downwardly from the lateral side and toe portions, the medial and lateral skirt portions comprising medial and lateral bottom portions for receiving an ice skate blade.

The invention also relates to a method of manufacturing an ice skate boot for enclosing a human foot, the foot having a heel, an ankle with a medial malleolus and a lateral malleolus, a plantar surface, medial and lateral sides and toes. The method comprises: (a) providing a sheet of thermoformable material; (b) thermoforming the sheet of thermoformable material to form an outer shell that comprises: (i) a heel portion for receiving the heel of the foot; (ii) an ankle portion for receiving the ankle; (iii) medial and lateral side portions for facing the medial and lateral sides of the foot respectively; (iv) medial and lateral toe portion for covering the toes of the foot; and (v) a medial skirt portion extending downwardly from the medial side and toe portions and a lateral skirt portion extending downwardly from the lateral side and toe portion; and (c) folding the medial and lateral skirt portions for forming medial and lateral bottom portions for receiving an ice skate blade.

These and other aspects and features of the present invention will now become apparent to those of ordinary skill in the art upon review of the following description of specific embodiments of the invention in conjunction with the accompanying drawings.

BRIEF DESCRIPTION OF THE DRAWINGS

A detailed description of examples of embodiments of the present invention is provided hereinbelow with reference to the following drawings, in which.

Figure 1:
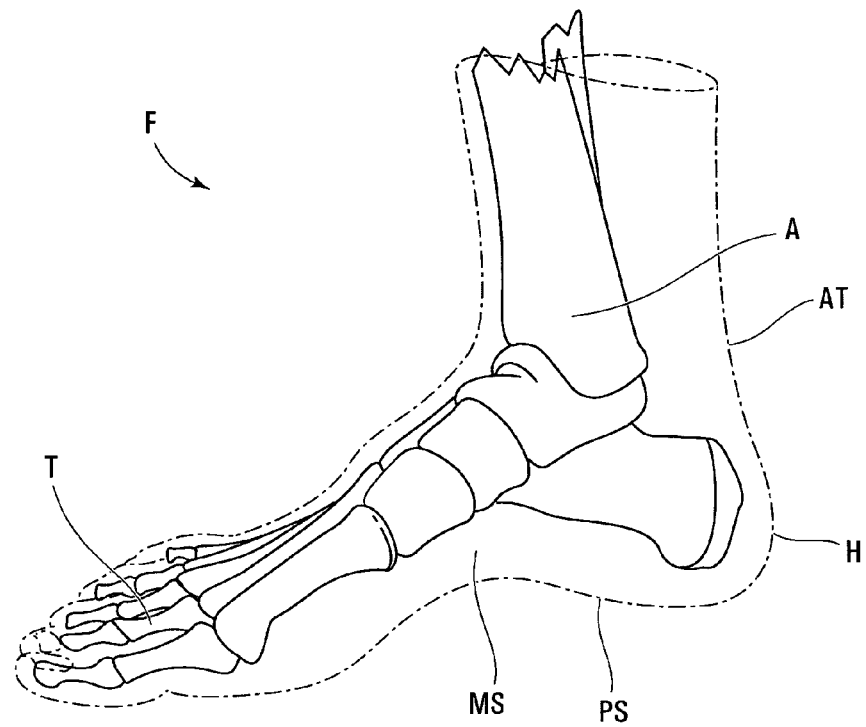
FIG. 1 is a side view of a right human foot with the integument of the foot shown in stippled lines and the bones shown in solid lines.

In the drawings, embodiments of the invention are illustrated by way of example. It is to be expressly understood that the description and drawings are only for the purposes of illustration and as an aid to understanding, and are not intended to be a definition of the limits of the invention.

DETAILED DESCRIPTION OF THE EMBODIMENTS

Figure 2:
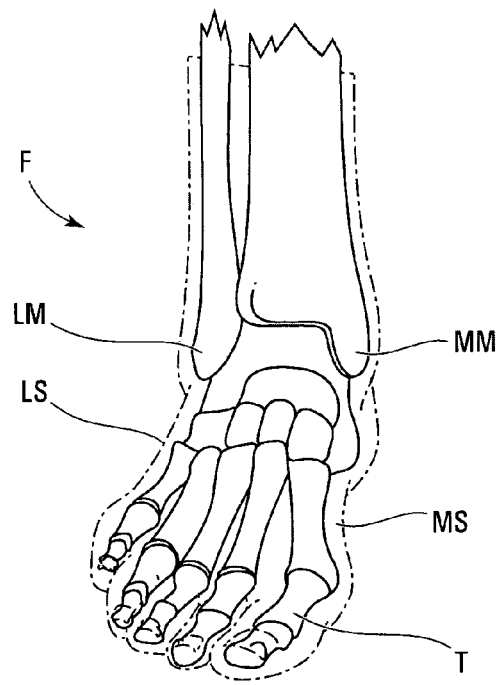
FIG. 2 is a front view of the human foot of FIG. 1.

Shown in FIGS. 1 and 2 is a typical right human foot F that includes toes T, a plantar surface PS, a medial side MS and a lateral side LS. In addition, the human foot includes a heel H, an Achilles tendon AT and an ankle A having a lateral malleolus LM and a medial malleolus MM, the lateral malleolus LM being at a lower position than the medial malleolus MM.

Figure 3:
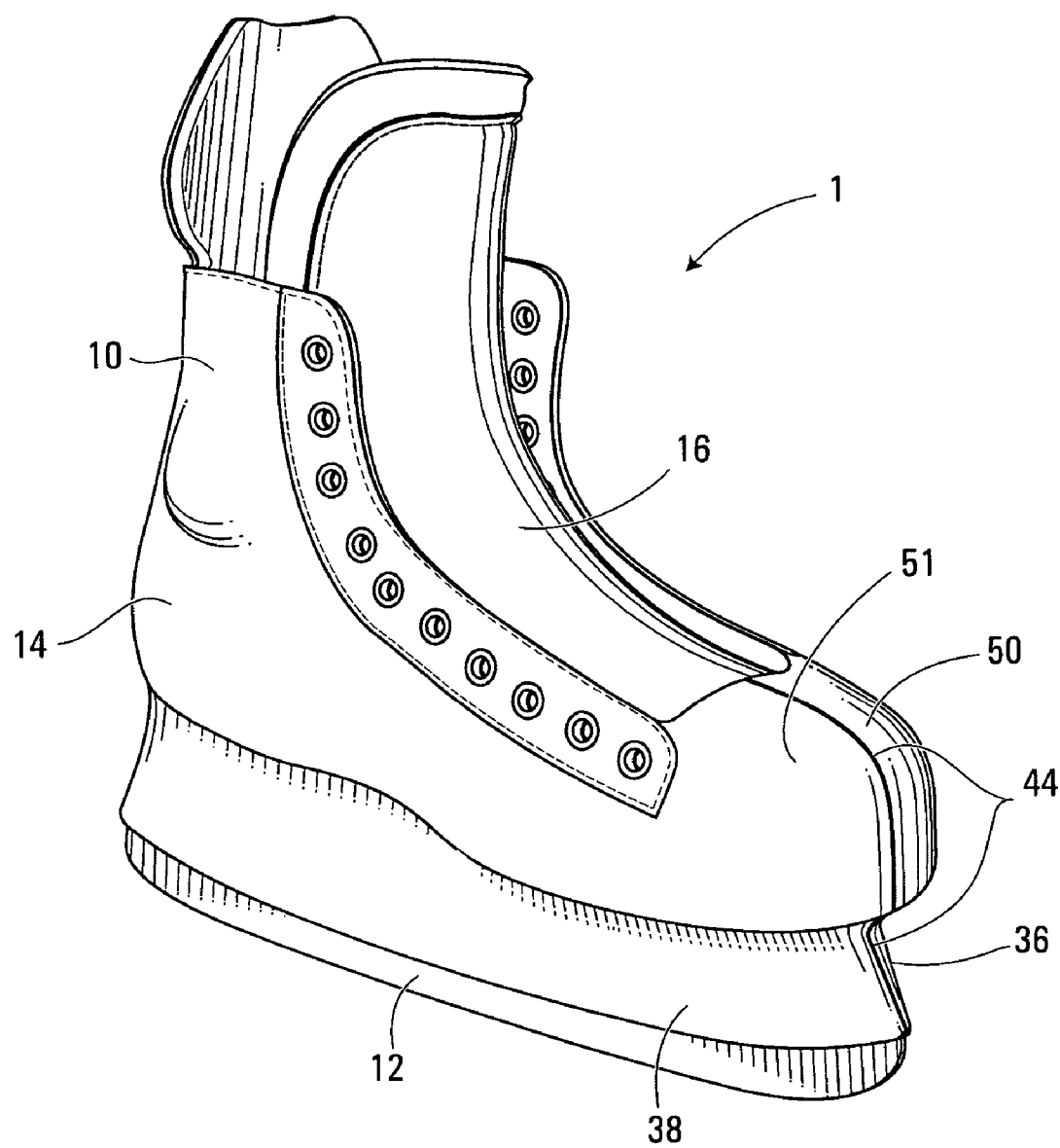
FIG. 3 is a perspective view of a skate with an ice skate boot in accordance with a first embodiment of the present invention.
Figure 4:
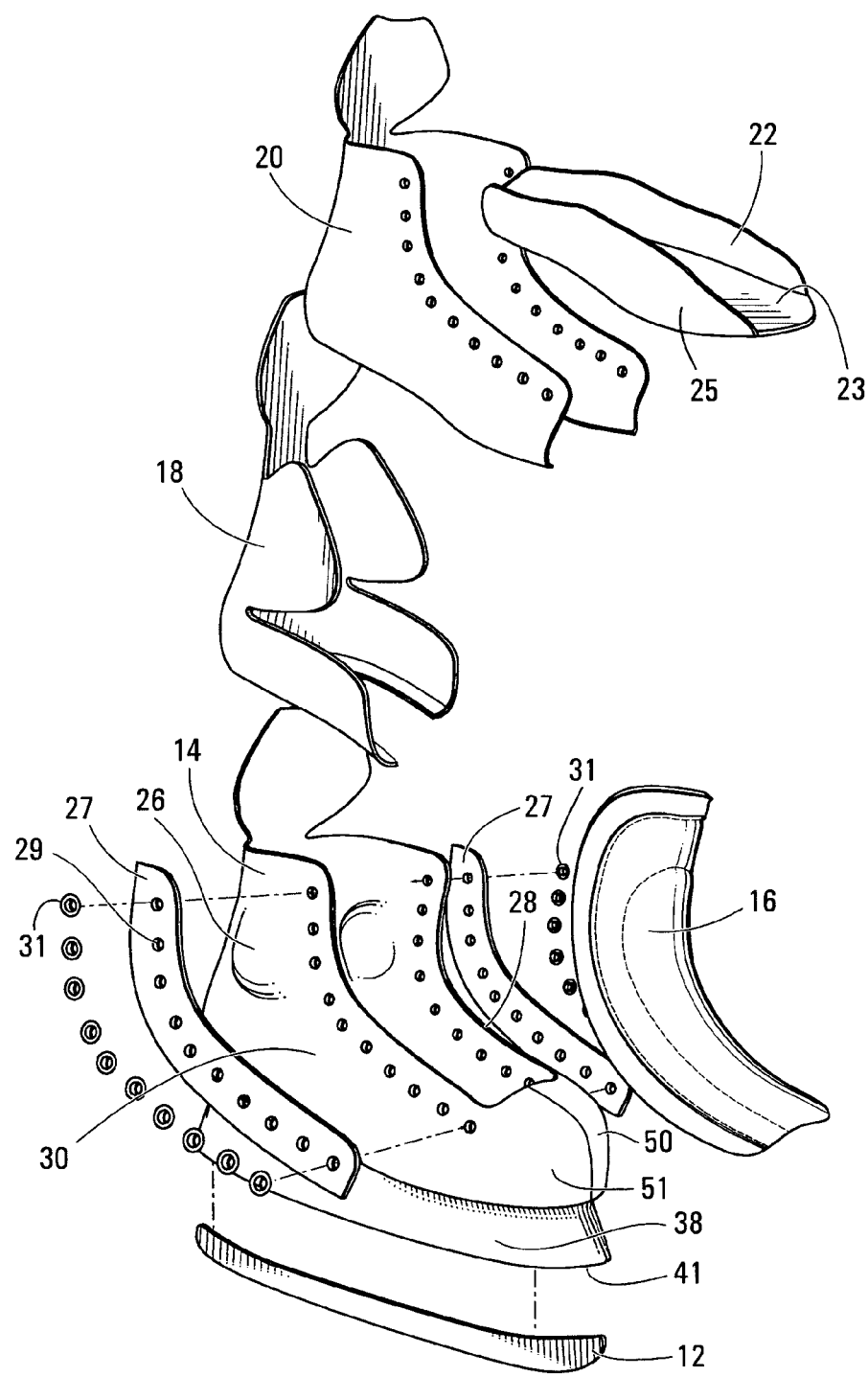
FIG. 4 is an exploded view of the ice skate of FIG. 3.

Shown in FIGS. 3 and 4 is an ice skate 1 that comprises a skate boot 10 and an ice skate blade 12. The skate boot 10 is suitable for enclosing the right human foot F and comprises an outer shell 14, a tongue 16, a rigid ankle support 18 (optional component), an inner lining 20 and a footbed 22. The outer shell 14 is made of a thermoformable material. As used herein, the expression "thermoformable material" refers to a material that is capable of softening when heated and of hardening again when cooled. Some non-limiting examples of different types of thermoformable material comprise ethylene vinyl acetate (EVA) foam, polyethylene foam, polystyrene foam, polypropylene foam and thermoformable materials sold under the trade-marks MEGABIX®, SURLYN®, SONTARA®, FORMO500®, BYLON®, MOSOCA® and NYLON® 66.

The inner lining 20 is glued or sewed to the inner surface of the outer shell 14. The inner lining 20 is made of a layer of soft material such as a sheet of polyester laminated with a layer of foam, or a layer of fabric made from 100% nylon fibers. The inner lining 20 comprises an inner surface that is adapted to contact the skin of heel H, ankle A, and medial and lateral sides MS, LS of the foot F in use.

The footbed 22 has an upper surface 23 for receiving the plantar surface PS and a padding wall 25 that projects upwardly from the upper surface 23 for partially cupping the heel H and extending up to a medial line of the foot F. The footbed 22 provides an envelope for the foot F that is comfortable yet offers a supporting "bed" that maintains the foot F.

Two narrow bands 27 are secured to the outer shell 14. The narrow bands 27 are made of fabric, textile or leather. Apertures 29 are punched through the narrow bands 27, the outer shell 14 and the inner lining 20. Once punched, the apertures 29 are reinforced by metallic rivets 31 or any suitable means known in the art of footwear construction.

As shown in FIGS. 3 to 7, the outer shell 14 is thermoformed such that it comprises a heel portion 24 for receiving the heel H, an ankle portion 26 for receiving the ankle A, medial and lateral side portions 28, 30 for facing the medial and lateral sides MS, LS of the foot F respectively, and medial and lateral toe portions 50, 51 for covering the toes T.

The medial and lateral side portions 28, 30 extend forwardly from the heel portion 24 and ankle portion 26. The heel portion 24 is substantially cup shaped for following the contour of the heel H. The ankle portion 26 comprises a medial cup-shaped depression 32 for receiving the medial malleolus MM and a lateral cup-shaped depression 34 for receiving the lateral malleolus LM. The lateral cup-shaped depression 34 is located slightly lower than the medial cup-shaped depression 32, for conforming to the morphology of the foot F.

Figure 7:
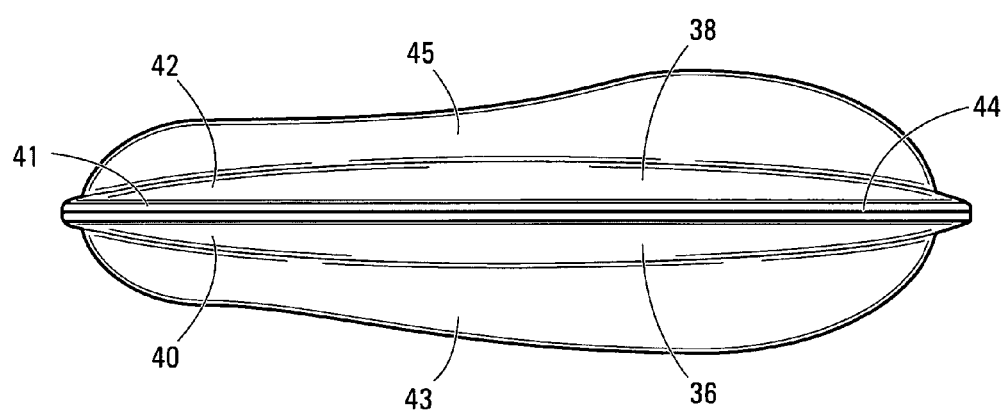
FIG. 7 is a bottom view of the outer shell of FIG. 6.
Figure 8:
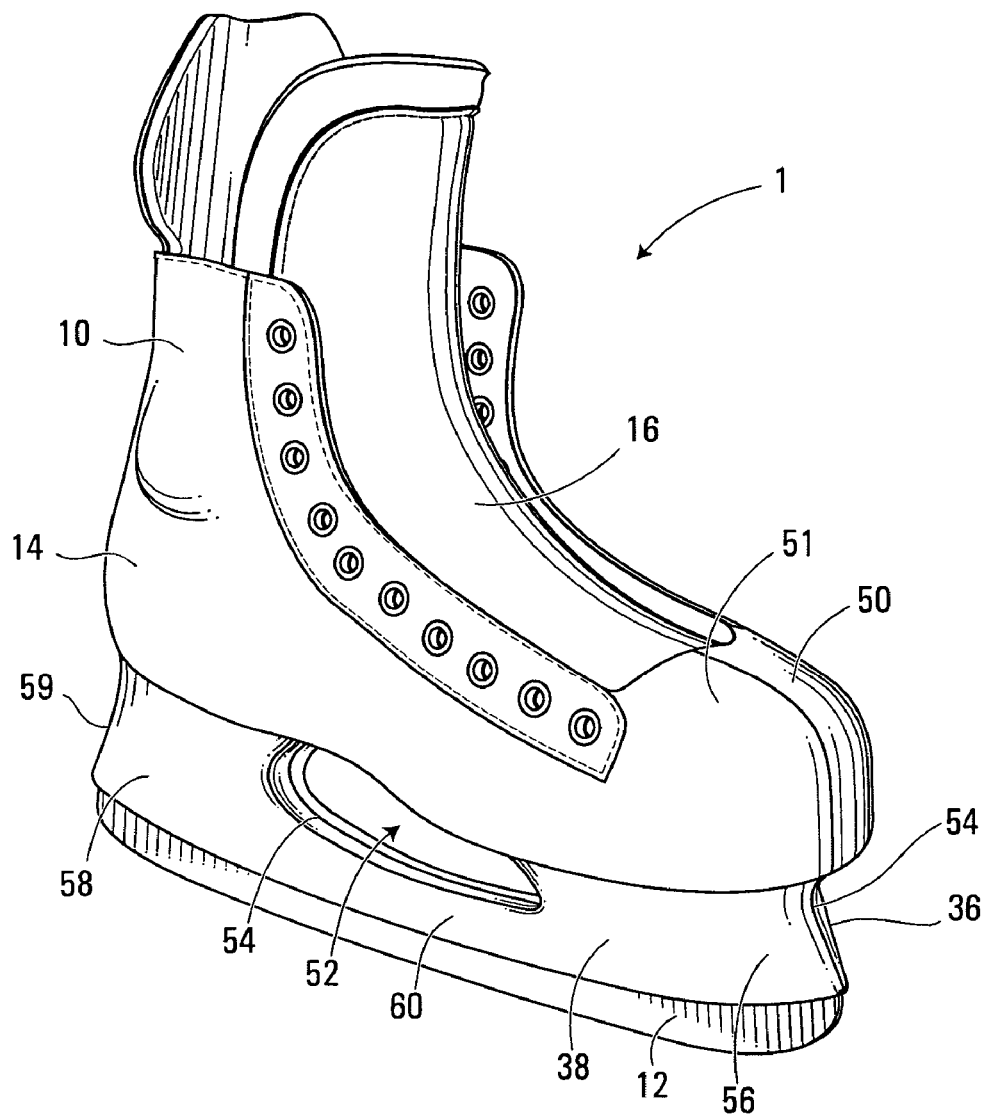
FIG. 8 is a perspective view of a skate with an ice skate boot in accordance with a second embodiment of the present invention.
Figure 9:
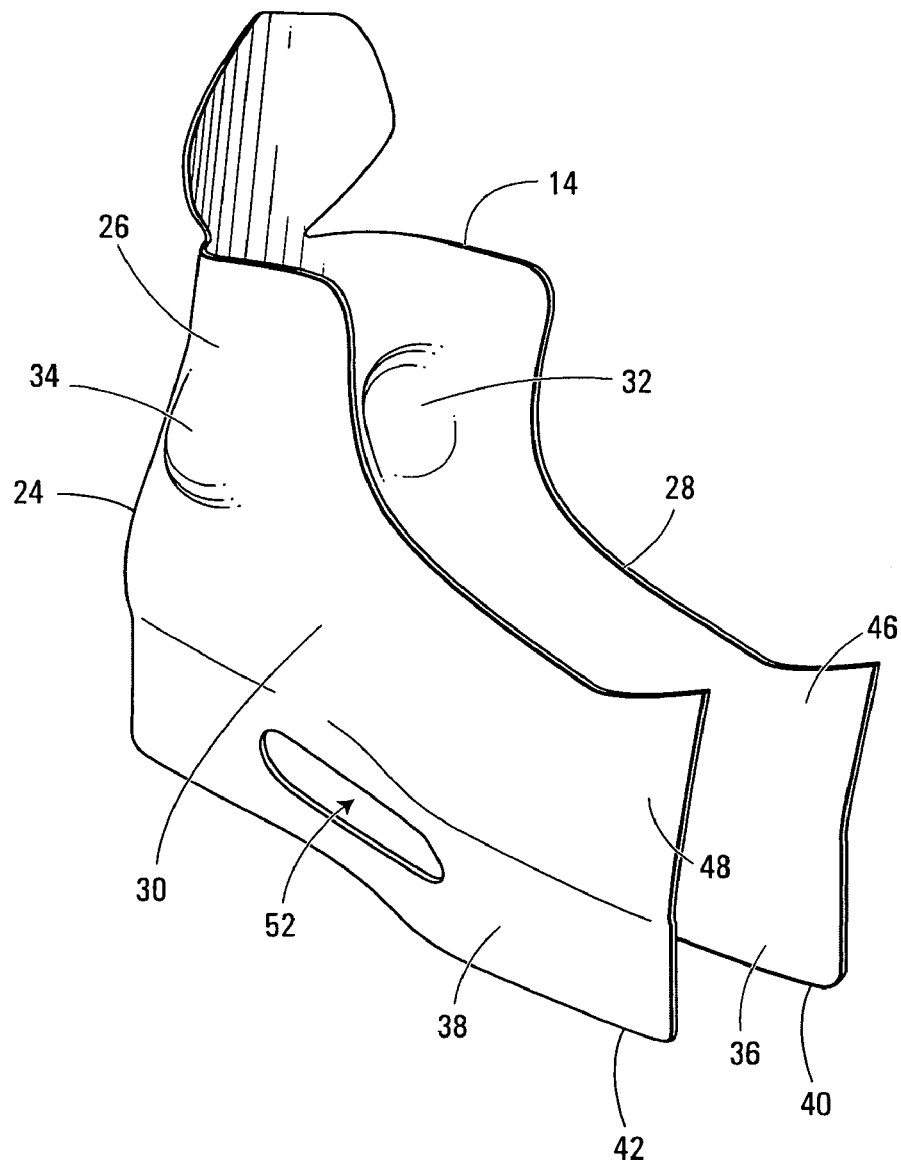
FIG. 9 is a perspective view of the outer shell of the skate of FIG. 8, wherein the outer shell is in a partial state of completion.

The medial and lateral side portions 28, 30 and the medial and lateral toe portions 50, 51 comprise respective medial and lateral skirt portions 36, 38 that extend downwardly therefrom. Moreover, during the thermoforming process, the medial and lateral skirt portions 36, 38 are folded inwardly in order to form respective medial and lateral bottom portions 40, 42 for receiving the blade 12. As best seen in FIG. 7, the medial and lateral bottom portions 40, 42 may have medial and lateral bottom surface that form a bottom surface 41 on which the blade 12 may be affixed. It is understood that the blade 12 may be affixed to one of the bottom surface of the bottom portions 40, 42 if one of the bottom portions 40, 42 is longer than the other. Alternatively, the bottom portions 40, 42 may comprise a longitudinal slot (not shown) in which the blade 12 is received.

The medial and lateral skirt portions 36, 38 may also be thermoformed such that they comprises respective medial and lateral sole portions 43, 45 for facing the plantar surface PS of the foot F. The medial and lateral bottom portions 40, 42 are joined together along a longitudinal line 44 and may be affixed together via any method known in the art, such as via stitching, thermal bonding, adhesive, piping, zipping or staples. The footbed 22 may sit upon the internal surfaces of the sole portions 43, 45 for covering the seam and/or gap where the two skirt portions 36, 38 meet.

Figure 5:
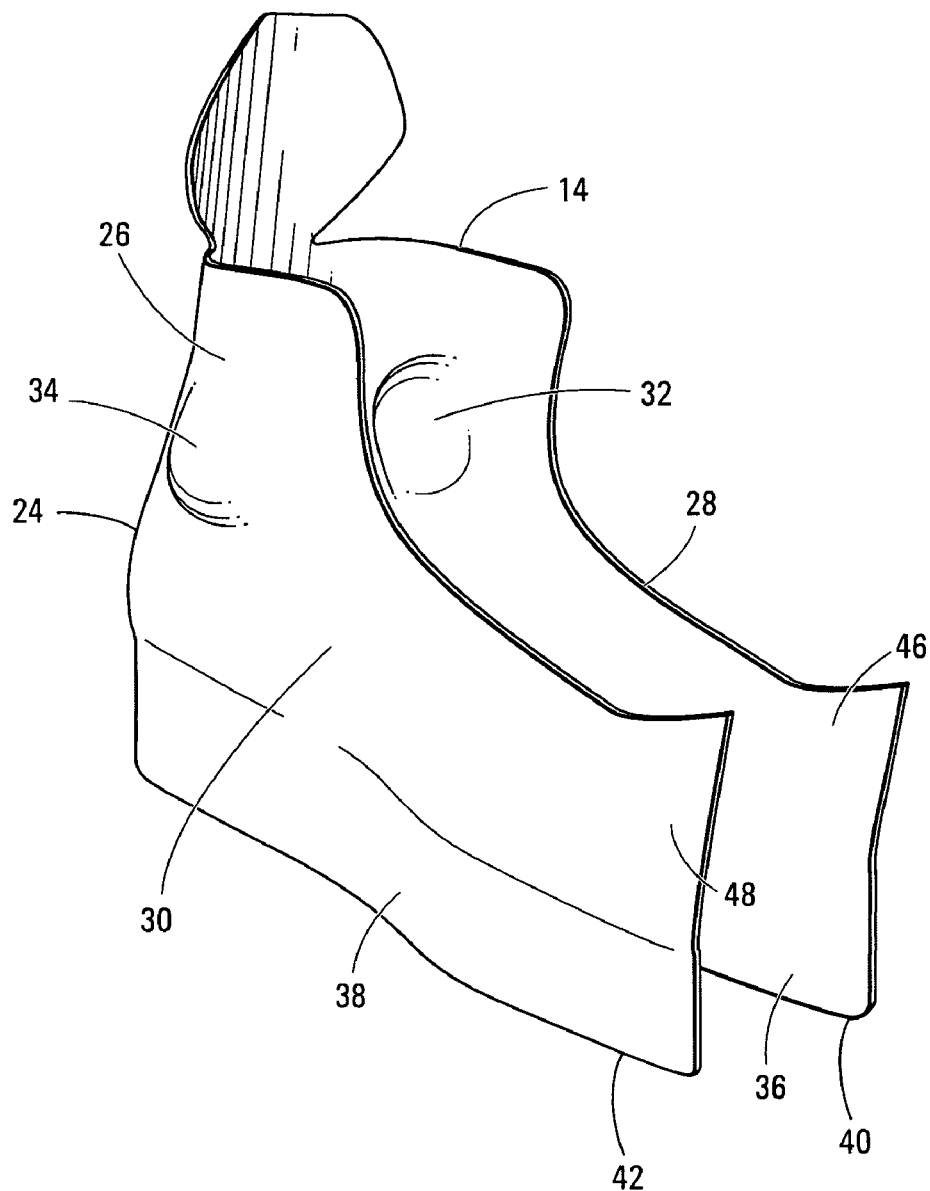
FIG. 5 is a perspective view of the outer shell of the skate boot of FIGS. 3 and 4, wherein the outer shell is in a partial state of completion.

As shown in FIG. 5, in its partial state of completion, the outer shell 14 comprises respective medial and lateral frontward portions 46, 48 that are folded inwardly so as to form the medial and lateral toe portions 50, 51. In the embodiment shown, the medial and lateral toe portions 50, 51 meet along the longitudinal line 44. However, in an alternative embodiment, one of the frontward portions 46, 48 can be longer than the other, such that when the two toe portions 50, 51 are joined together, they are not joined along the longitudinal line 44. The toe portions 50, 51 may be affixed together via any method known in the art, such as via stitching, thermal bonding, adhesive, piping, zipping or staples.

The tongue 16 is affixed to the toe portions 50, 51 and extends upwardly and rearwardly from the toe portions 50, 51 for covering the forefoot of the foot F. The frontal edge of the tongue 16 can be sewn directly to the toe portions 50, 51 or can be fixed in an alternative manner known in the art.

In an alternative embodiment not shown in the figures, the outer shell 14 comprises a tongue portion that is integrally formed with one of the medial and lateral side portions 28, 30. As such, once thermoformed, the tongue portion extends upwardly from one of the toe portions 50, 51 in order to form a tongue that is integrally formed with the outer shell 14.

FIGS. 8 to 11 show a second embodiment of the skate boot 10 in which a reference numeral designating an element of the first embodiment illustrated in FIGS. 3 to 7 designates the same element to facilitate the description.

Figure 10:
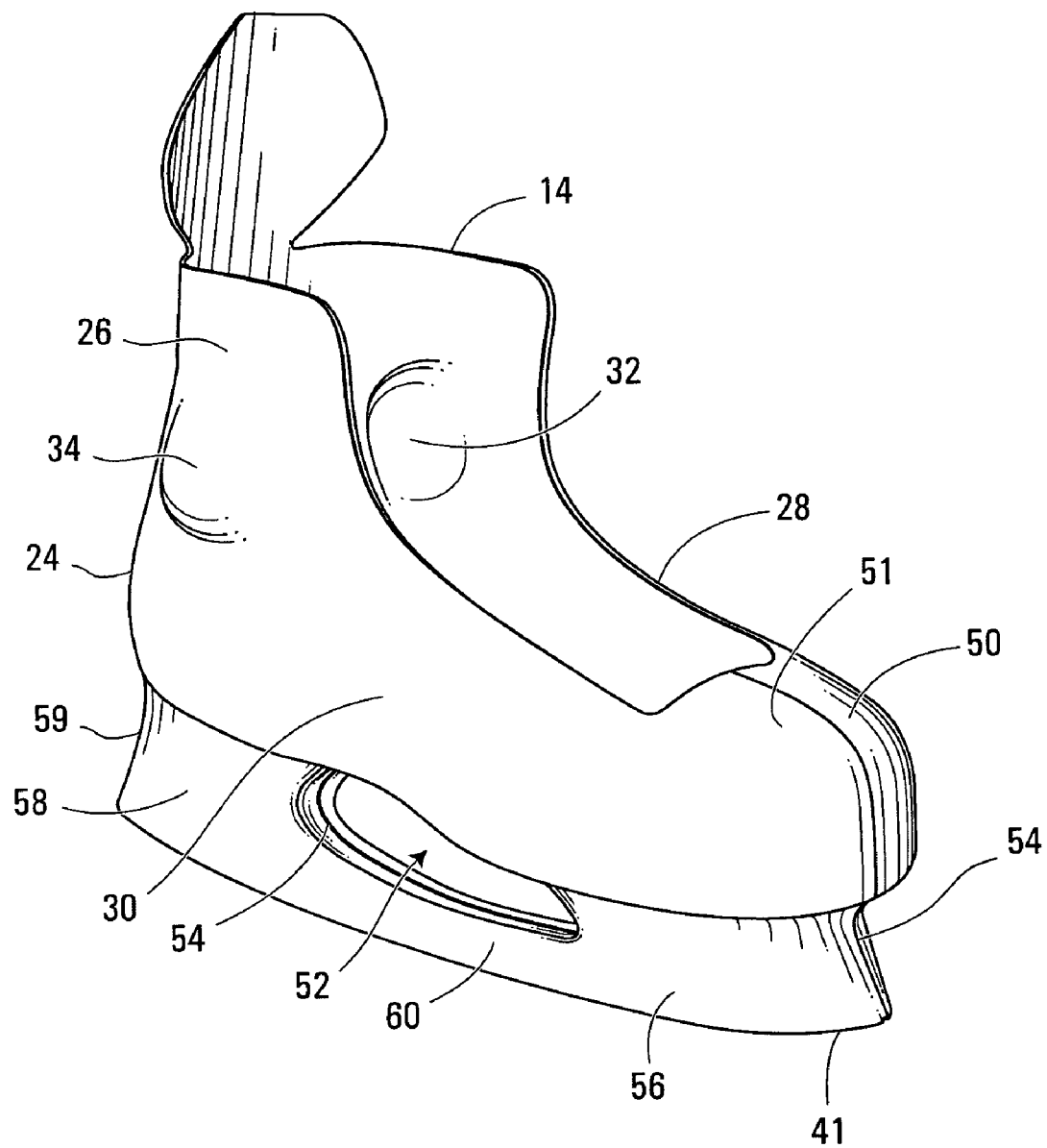
FIG. 10 is a perspective view of the outer shell of the skate boot of FIG. 8.
Figure 11:
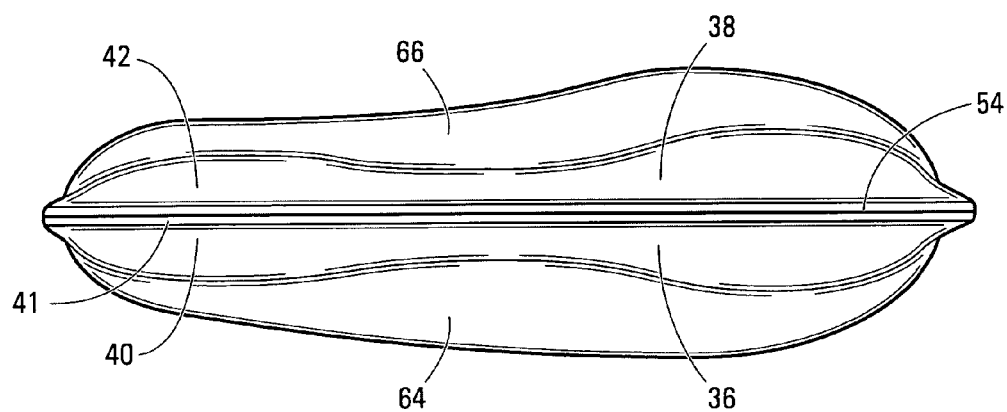
FIG. 11 is a bottom view of the outer shell of FIG. 10.

In this second embodiment, the skate boot 10 is identical to the one illustrated in FIGS. 3 and 4 to the exception that the medial and lateral skirt portions 36, 38 of the outer shell 14 have each an aperture 52 for reducing the weight of the skate boot 10. Moreover, the medial and lateral skirt portions 36, 38 form a front pedestal 56, a rear pedestal 58 with a rear portion 59 and a bridge portion 60 interconnecting the front and rear pedestals 56, 58. As shown in FIG. 10, the apertures 52 are located between the front and rear pedestals 56, 58 and above the bridge portion 60. The medial and lateral skirt portions 36, 38 are integrally formed at the rear portion 59 of the rear pedestal 58 and the bottom portions 40, 42 and the toe portions 50, 51 are affixed together along a longitudinal line 54. The medial and lateral bottom portions 40, 42 comprise medial and lateral bottom surfaces that form the bottom surface 41 on which the blade 12 may be affixed. Alternatively, the bottom portions 40, 42 may comprise a longitudinal slot (now shown) in which the blade 12 may be mounted. As shown in FIG. 11, the medial and lateral skirt portions 36, 38 may also be thermoformed such that they comprise respective medial and lateral sole portions 64, 66 for facing the plantar surface PS of the foot F.

Figure 12:
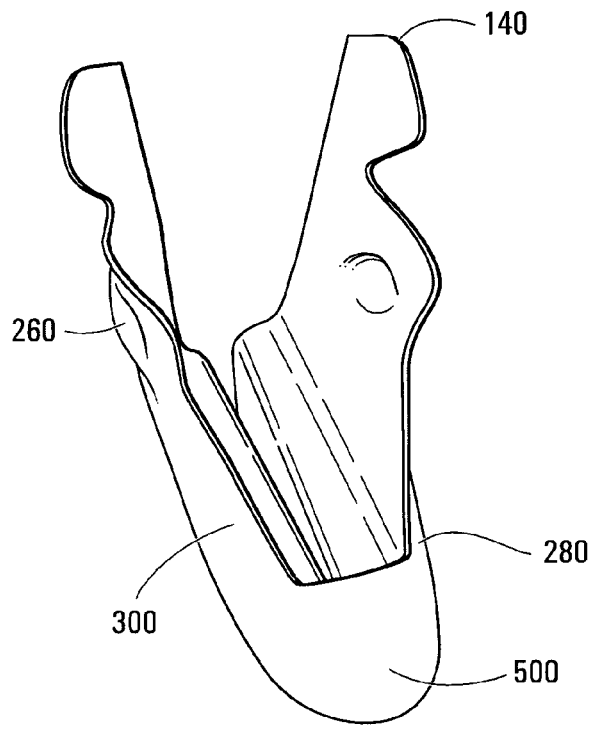
FIG. 12 is a top, front perspective view of an outer shell in accordance with another embodiment of the invention, wherein the outer shell is in a partial state of completion.
Figure 13:
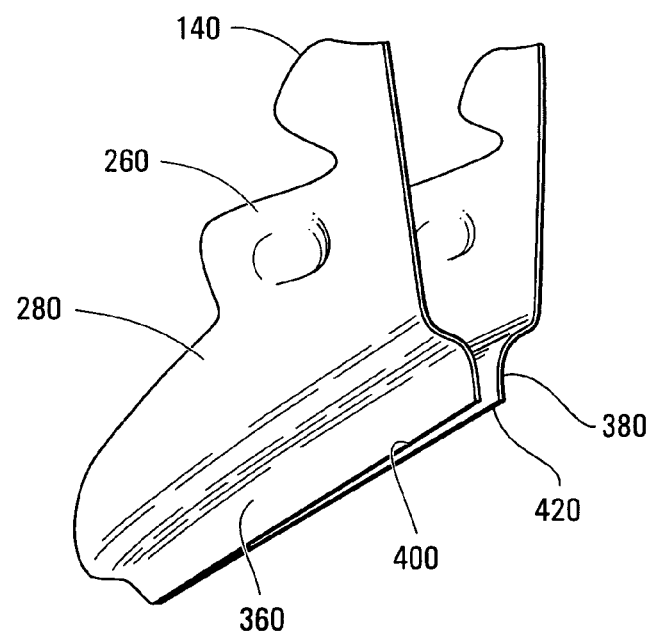
FIG. 13 is a bottom, rear perspective view of the outer shell of FIG. 12.

FIGS. 12 and 13 show another embodiment of an outer shell 140 made of a thermoformable material and thermoformed such that it comprises an ankle portion 260 for receiving the ankle A, medial and lateral side portions 280, 300 for facing the medial and lateral sides MS, LS of the foot F respectively, and a toe cap 500 for covering the toes T. The toe cap 500 is integrally formed with the medial and lateral side portions 280, 300.

The medial and lateral side portions 280, 300 and the toe cap 500 comprise respective medial and lateral skirt portions 360, 380 that extend downwardly therefrom. Moreover, during the thermoforming process, the medial and lateral skirt portions 360, 380 are folded inwardly in order to form respective medial and lateral bottom portions 400, 420 for receiving the blade 12. The medial and lateral bottom portions 400, 420 may have medial and lateral bottom surface that form a bottom surface on which the blade 12 may be affixed. It is understood that the blade 12 may be affixed to one of the bottom surface of the bottom portions 400, 420 if one of the bottom portions 400, 420 is longer than the other. Alternatively, the bottom portions 400, 420 may comprise a longitudinal slot (not shown) in which the blade 12 is received.

The medial and lateral skirt portions 360, 380 may also be thermoformed such that they comprises respective medial and lateral sole portions for facing the plantar surface PS of the foot F. The medial and lateral bottom portions 400, 420 may be affixed together and the outer shell 140 may be completed by affixing together its rear portions.

The method of forming the outer shell 14 in accordance with the present invention will now be described herein below with reference to FIGS. 14 and 15. For the purposes of the present application, the method will be described with respect to the outer shell 14, but it should be appreciate that the method could have also been described with respect to the outer shell 140.

The first step in manufacturing the outer shell 14 is to die-cut a blank 90 from a sheet of material 92, the blank 90 having the profile of the outer shell 14. Machines and methods for die-cutting shapes from sheets of material are known in the art, and as such will not be described in more detail herein. As shown in FIG. 14, the blank 90 may include a plurality of projections 94 in the region close to the heel portion.

The sheet of material 92 may be a composite sheet having a layer of thermoformable foam. Some non-limiting examples of different types of thermoformable foam include ethylene vinyl acetate (EVA) foam, polyethylene foam and polypropylene foam. High density polyethylene (HDPE) 1300, 1100 and 0907 foams can also be used. The sheet may be made of thermoforming materials such as those sold under the trade-mark MEGABIX® (a core of extruded SURLYN®, a backing of SONTARA® and a hot melt coating; thickness of 0.95 mm), FORMO500® (non woven polyester with a core of extruded polyolefinic, stiffening layers of synthetic latex on each side and an ethylene vinyl acetate hot melt adhesive on one side; thickness of 1.50 mm), BYLON® (a nylon multifilament with a backing of black saturated needle punched polyester nonwoven and a face coating of non-fray urethane) and MOSOCA® (NYLON®66 with a core of SURLYN® and a PU coating). The composite sheet may also be made of a first sheet of polyethylene high density (HDPE) foam; a second sheet of thermoplastic; and a third composite sheet made of a first layer of cotton, a second layer of surlyn fibers, a third layer of a mesh of nylon fibers and a coating. These sheets being laminated together before or during the thermoforming process of the outer shell.

The sheet of material 92 may include two or three layers, wherein the outer layer of the outer shell 14 is more rigid that its inner layer. A layer of thermoformable foam may be placed between the outer and inner layers.

Figure 6:
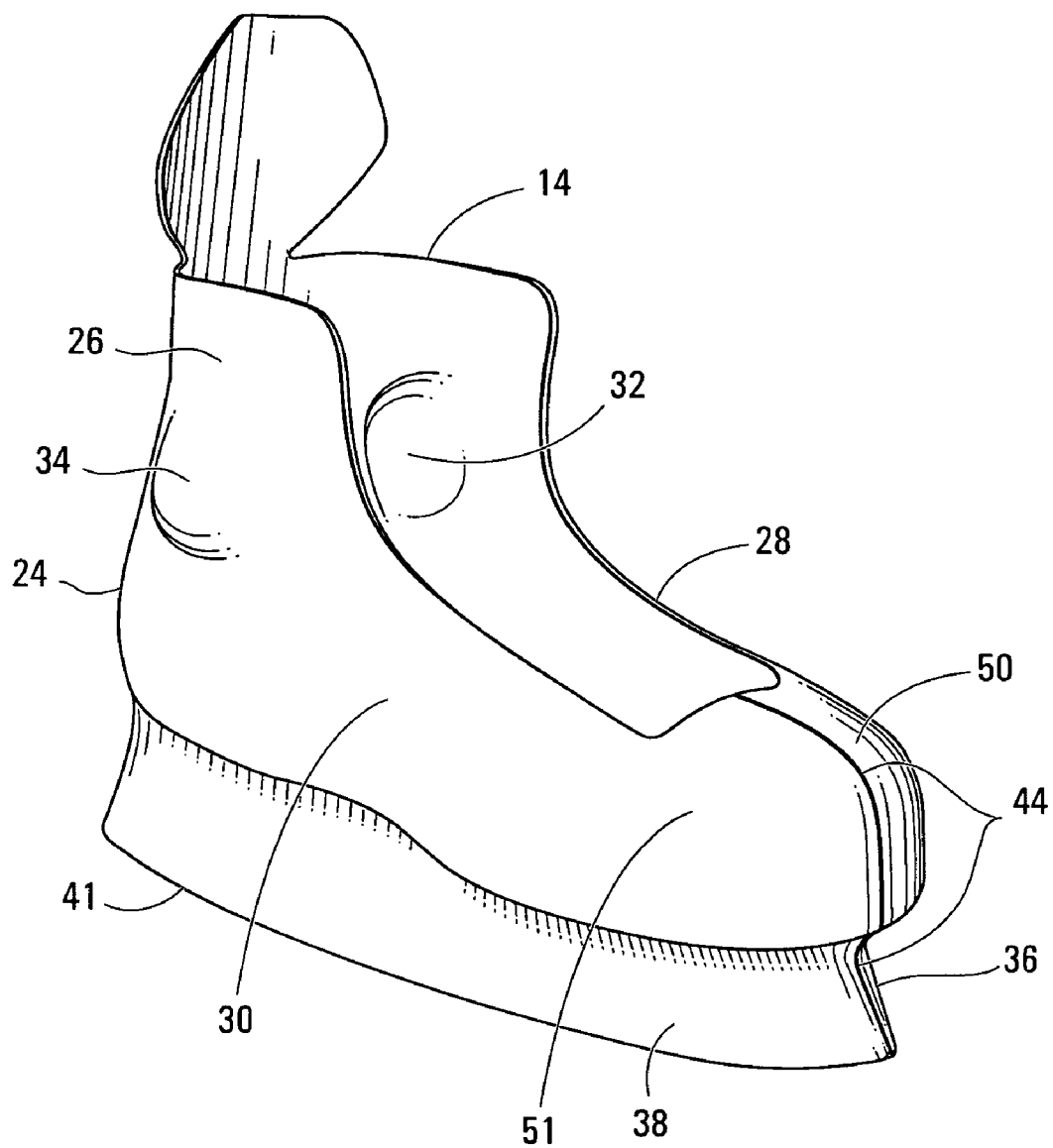
FIG. 6 is a perspective view of the outer shell of the skate of FIGS. 3 and 4.

The second step in manufacturing the outer shell 14 is to thermoform the blank 90 into the three-dimensional shape of the outer shell 14 shown in FIG. 6 or FIG. 10.

Figure 14:
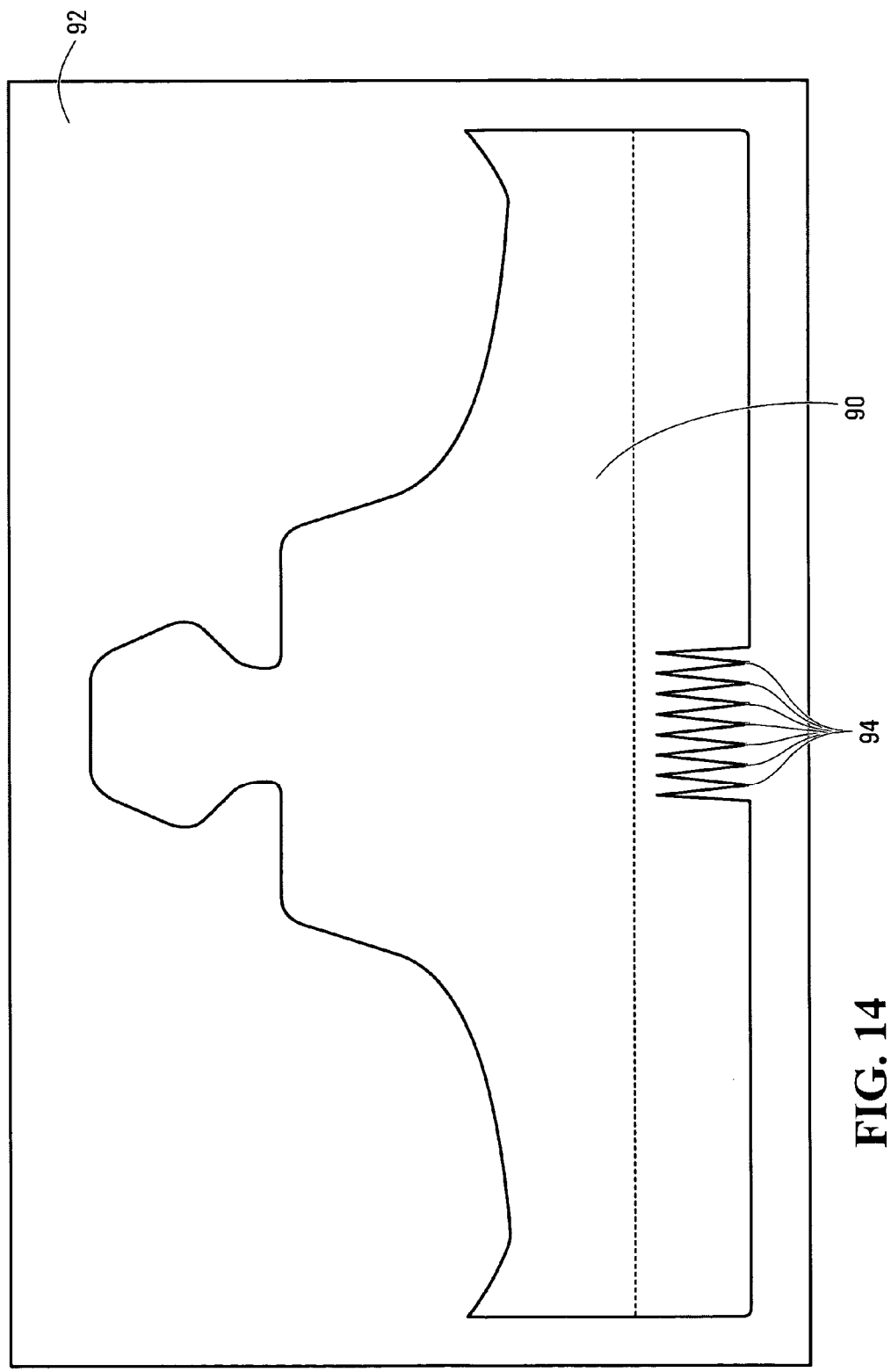
FIG. 14 shows a sheet of material with a profile of an outer shell.
Figure 15:
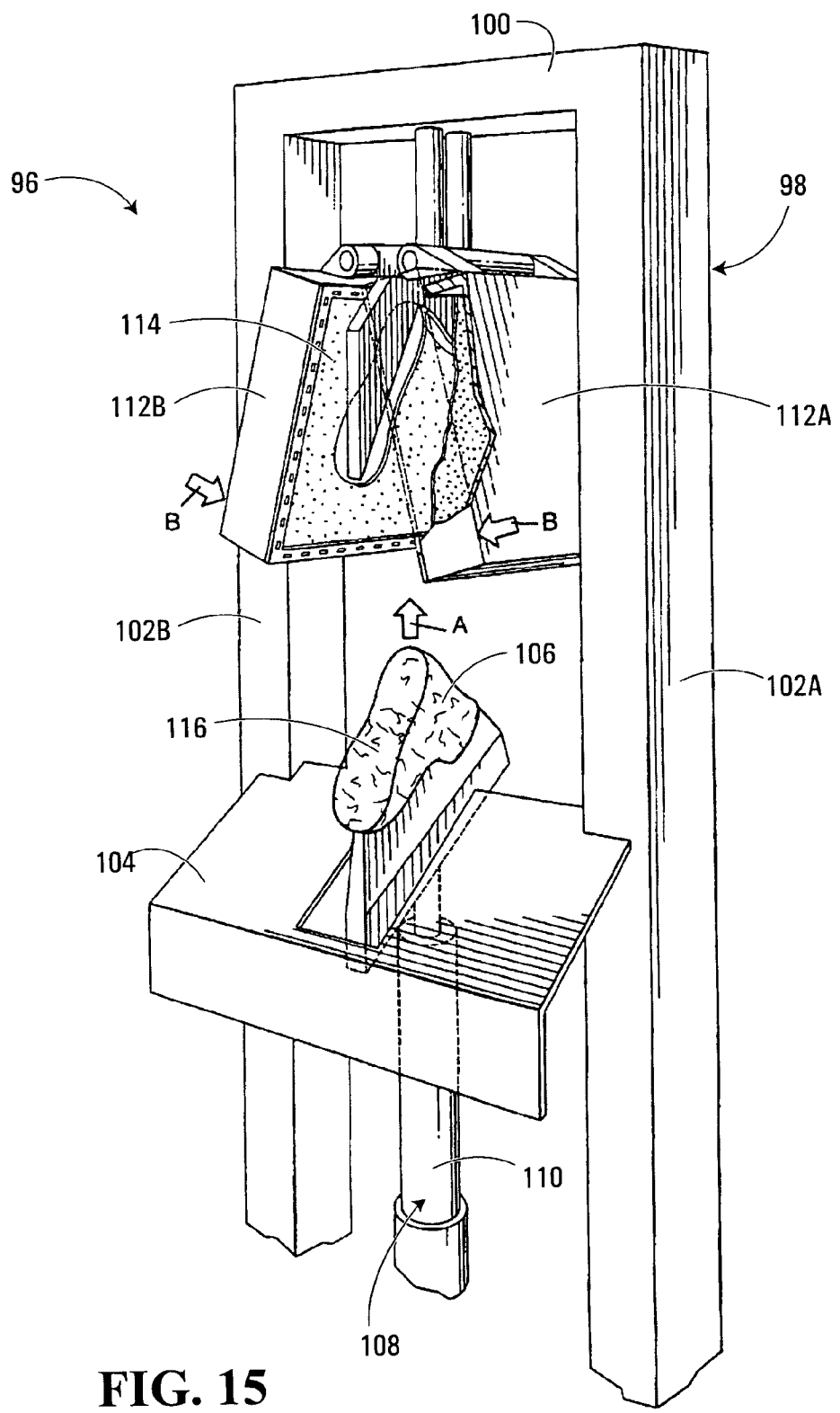
FIG. 15 shows a machine suitable for thermoforming an outer shell in accordance with the present invention.

Shown in FIG. 14 is a non-limiting example of an apparatus 96 suitable for thermoforming the blank 90. The apparatus 96 comprises a supporting frame 98 having an outer shell traverse 100 and two pillars 102A and 102B. The two pillars 102A and 102B are joined together at mid-height by a ledge 104 that contains a control panel (not shown) with control buttons (not shown) for enabling an operator to control the apparatus 96. In the specific embodiment shown, the ledge 104 surrounds a last 106 that is supported by a movable support 108. The movable support 108 is a hydraulic or pneumatic piston cylinder 110 that is movable up and down in a vertical direction, as indicated by arrow A. It should be understood that lasts 106 of different shapes and sizes can be installed on apparatus 96 in order to manufacture outer shells 14 of different shapes and sizes.

The apparatus 96 further comprises a pair of clamps 112A, 112B that are mounted to the outer shell traverse 100 and positioned directly above last 106. Clamps 112A, 112B are adapted to open and close, as indicated by arrows B in order to clamp around the last 106. The clamps 112A, 112B comprise pressure pads 114 for receiving the shape 94 of thermoformable material. In addition, each of the clamps 112A, 112B comprises a bladder (not shown) having an inflated membrane and a fluid pressure delivery circuit (not shown) for causing the membrane to inflate, such that it is able to surround the last 106 during use.

In operation, the blank 90 is placed on the last 106 and is accurately positioned and secured in place via the use of clips (not shown). Once the blank 90 is securely in place, the operator activates the apparatus 96 which causes the piston-cylinder 110, and therefore the last 106, to raise up between the two open clamps 112A, 112B. When the last 106 reaches the pressure pads 114, the piston-cylinder 110 reaches a set value and stops. It should be understood that in an alternative embodiment, the last 106 can remain stationary, and the clamps 112A, 112B can be connected to piston-cylinders for lowering the clamps 112A, 112B around the last 106.

Once the last 106 is positioned between clamps 112A, 112B, the clamps 112A, 112B begin to close thereby causing the pressure pads 114 to apply an initial pressure to the blank 90 positioned on the last 106. When the clamps 112A, 112B are completely closed, the bladders are then inflated by air or liquid injection, which forces the flexible membranes of the bladders to encircle the blank 90 around the last 106 and apply pressure thereto. Once the pressure within the bladders has reached a set value wherein the bladder membranes apply an even pressure to the thermoformable material, the pressure is maintained for a certain amount of time, and is then released. In a non-limiting embodiment, a pressure of between 30 psi and 120 psi is maintained around the last 106 for approximately 1 to 2 minutes. In addition to the pressure, heat is also applied to the thermoformable material. The applied heat is generally between 250° F. and 550° F., with the preferred temperature being approximately 450° F. Once heated, the thermoformable material becomes malleable and, as such, is able to acquire the three-dimensional shape applied to it by the last 106.

When the bladders 114 apply pressure and heat to the blank 90, they are able to press the thermoformable material around the last. For example, the bladders 114 are adapted for applying a pressure on the medial and lateral skirt portions 36, 38 such that they are folded inwardly and joined together along the longitudinal line 44 (or 54) for forming the bottom portions 40, 42 that is adapted for receiving the blade 12. The bladders 114 may also apply a pressure on the medial and lateral skirt portions 36, 38 such that they form the respective medial and lateral sole portions 43, 45 (or 64, 66) for facing the plantar surface PS of the foot. In other words, the medial and lateral skirt portions 36, 38 are pushed together so as to form the bottom portions 40, 42 and the sole portions 43, 45 (or 64, 66). The bladders 114 (or other bladders) may also be adapted for applying pressure on the frontward portions 46, 48 such that they are folded around the toe portion of the last 106 to form the toe portions 50, 51 for covering the toes T.

Once the outer shell 14 has been thermoformed and molded into the final shape shown in FIG. 6 or 10, the last 106 is lowered by the piston cylinder 110 to its original position. The medial and lateral bottom portions 40, 42 (or 400, 420) and toe portions 50, 51 may then be affixed together using a chosen one of the techniques described above, such as stitching, adhesive, piping, zipping, staples and thermal bonding.

Once the skate boot 10 has been assembled, the ice skate blade 12 is mounted to the bottom portions 40, 42. More specifically, the ice blade 12 may be affixed to the bottom surface 41 or it may be inserted in a longitudinal groove formed in the bottom portions 40, 42 and then secured in place using any manner known in the art, such as screws, adhesive or any other attachment means known in the art.

The above description of the embodiments should not be interpreted in a limiting manner since other variations, modifications and refinements are possible within the spirit and scope of the present invention. The scope of the invention is defined in the appended claims and their equivalents.

The invention claimed is:

1. An ice skate boot comprising an outer shell for enclosing a human foot, the foot having a heel, an ankle with a medial malleolus and a lateral malleolus, a plantar surface, medial and lateral sides and toes, said outer shell being made of a composite sheet comprising a layer of thermoformable material, said outer shell being thermoformed such that it comprises:
   (a) a heel portion for receiving the heel of the foot;
   (b) an ankle portion for receiving the medial malleolus and the lateral malleolus of the ankle;
   (c) medial and lateral side portions for receiving the medial and lateral sides of the foot respectively;
   (d) medial and lateral toe portions for covering the toes of the foot; and
   (e) a medial skirt portion extending downwardly from said medial side and toe portions and a lateral skirt portion extending downwardly from said lateral side and toe portions, said medial and lateral skirt portions comprising medial and lateral bottom portions for receiving an ice skate blade.

2. An ice skate boot as defined in claim 1, wherein said medial and lateral bottom portions comprise medial and lateral bottom surfaces on which the ice skate blade is affixed.

3. An ice skate boot as defined in claim 1, wherein said medial and lateral bottom portions comprise medial and lateral bottom surfaces, the ice skate blade being affixed on one of said medial and lateral bottom surfaces.

4. An ice skate boot as defined in claim 1, wherein said medial and lateral bottom portions define a longitudinal groove in which the ice skate blade is received.

5. An ice skate boot as defined in claim 1, wherein said medial and lateral bottom portions are affixed together.

6. An ice skate boot as defined in claim 5, wherein said medial and lateral skirt portions are thermoformed such that they comprise respective medial and lateral sole portions for facing the plantar surface of the foot.

7. An ice skate boot as defined in claim 6, wherein said medial and lateral bottom portions comprises medial and lateral bottom surfaces on which the ice skate blade is affixed.

8. An ice skate boot as defined in claim 6, wherein said medial and lateral bottom portions comprises medial and lateral bottom surfaces, the ice skate blade being affixed on one of said medial and lateral bottom surfaces.

9. An ice skate boot as defined in claim 6, wherein said medial and lateral bottom portions define a longitudinal groove in which the ice skate blade is received.

10. An ice skate boot as defined in claim 6, wherein said medial and lateral skirt portions comprise respective medial and lateral apertures for reducing the weight of said skate boot.

11. An ice skate boot as defined in claim 10, wherein said medial and lateral skirt portions are thermoformed such that they comprise a front pedestal, a rear pedestal and a bridge portion interconnecting said front and rear pedestals, said medial and lateral apertures being located between said front and rear pedestals and above said bridge portion.

12. An ice skate boot as defined in claim 11, wherein said medial and lateral bottom and toe portions are affixed together along a longitudinal line.

13. An ice skate boot as defined in claim 12, wherein said medial and lateral skirt portions are integrally formed together at a rear portion of said rear pedestal.

14. An ice skate boot as defined in claim 12, wherein said medial and lateral skirt portions are integrally formed together at a front portion of said front pedestal.

15. An ice skate boot as defined in claim 6, wherein said medial and lateral toe portions are integrally formed together for forming an integrated toe cap.

16. An ice skate boot as defined in claim 6, comprising a tongue extending upwardly and rearwardly from said medial and lateral toe portions.

17. An ice skate boot as defined in claim 6, comprising a tongue that is integrally formed with one of said medial and lateral side portions.

18. An ice skate boot as defined in claim 15, comprising a tongue extending upwardly and rearwardly from said toe cap.

19. An ice skate boot as defined in claim 18, wherein said tongue is integrally formed with one of said medial and lateral side portions.

20. An ice skate boot as defined in claim 1, wherein said composite sheet comprises an outer layer and an inner layer, said outer layer being more rigid than said inner layer.

21. An ice skate boot as defined in claim 20, wherein said composite sheet comprises a layer of thermoformable foam between said outer and inner layers.

22. An ice skate boot as defined in claim 6, wherein said composite sheet comprises layers of different grades of thermoformable foam.

23. An ice skate boot as defined in claim 1, wherein said heel portion is substantially cup shaped for following the contour of the heel of the foot.

24. An ice skate boot as defined in claim 23, wherein said ankle portion comprises a cup-shaped lateral depression for receiving the lateral malleolus and a cup-shaped medial depression for receiving the medial malleolus.

25. An ice skate boot as defined in claim 24, wherein said lateral cup-shaped depression is below said medial cup-shaped depression.

26. An ice skate boot as defined in claim 1, comprising an inner lining affixed to an inner surface of said outer shell, said inner lining comprising a surface intended for contact with the heel, ankle and medial and lateral sides of the foot.

27. An ice skate boot as defined in claim 1, comprising a footbed having an upper surface facing the plantar surface of the foot and a wall projecting upwardly from said upper surface, said wall partially cupping the heel and extending up to a medial line of the foot.

28. A method of manufacturing an ice skate boot, said method comprising:
   (a) providing a composite sheet comprising a layer of thermoformable material;
   (b) thermoforming said composite sheet to form an outer shell for enclosing a human foot, the foot having a heel, an ankle with a medial malleolus and a lateral malleolus, a plantar surface, medial and lateral sides and toes, said outer shell comprising:
      (i) a heel portion for receiving the heel of the foot;
      (ii) an ankle portion for receiving the medial malleolus and the lateral malleolus of the ankle;
      (iii) medial and lateral side portions for receiving the medial and lateral sides of the foot respectively;
      (iv) medial and lateral toe portions for covering the toes of the foot; and
      (v) a medial skirt portion extending downwardly from said medial side and toe portions and a lateral skirt portion extending downwardly from said lateral side and toe portions; and (c) folding said medial and lateral skirt portions for forming medial and lateral bottom portions for receiving an ice skate blade.

29. A method as defined in claim 28, comprising folding said medial and lateral skirt portions for forming medial and lateral sole portions for facing the plantar surface of the foot.

30. A method as defined in claim 29, comprising affixing together said medial and lateral bottom portions for forming a bottom surface on which an ice skate blade is mountable.

31. A method as defined in claim 29, comprising forming a longitudinal groove within said medial and lateral bottom portions for receiving an ice skate blade in said groove.

32. A method as defined in claim 29, comprising affixing an inner lining to an inner surface of said outer shell, said inner lining comprising a surface intended for contact with the heel, ankle and lateral and medial sides of the foot.

33. A method as defined in claim 29, comprising affixing a tongue to said medial and lateral toe portions.

34. A method as defined in claim 29, comprising die-cutting a blank from said composite sheet, said blank having the profile of said outer shell.

* * * * *